2,792,407

PROCESS FOR PREPARING CHROMANONES

Samuel Allen Heininger, Dayton, Ohio, assignor to Monsanto Chemical Company, St. Louis, Mo., a corporation of Delaware No Drawing. Application January 7, 1955,
Serial No. 480,615

2 Claims. (Cl. 260—345.2)

This invention relates to a method for preparing 4-chromanimines. In its more specific aspects, the invention relates to a method for preparing 4-chromanones. More particularly, the invention relates to the above methods in which a particular type of nitrile compound is cyclized in the presence of a particular class of phosphoric acids, namely, polyphosphoric acids.

Previous attempts to cyclize aryloxy alkylnitriles with phosphoric acids have been unsuccessful. For example, Bachman and Levine (Journal of the American Chemical Society, 70, pp. 599–601 (1948)) attempted the cyclization of 3-aryloxypropionitriles in the presence of orthophosphoric acid and obtained only the corresponding propionic acid, with formation of no chromanimine or chromanone.

Furthermore, it is known that the general reaction of a nitrile in the presence of a polyphosphoric acid results in the formation of the corresponding amide. See, for example, Snyder and Elston (Journal of the American Chemical Society, 76, pp. 3039–42 (1954)).

In spite of the foregoing, I have now found that aryloxypropionitriles and arylmercaptopropionitriles can be cyclized in the presence of polyphosphoric acids to form the corresponding chromanimines, which in turn can be readily hydrolyzed to 4-chromanones. Typical examples of the foregoing class of nitriles which can be cyclized according to the present invention are the simple aryloxypropionitriles and arylmercaptopropionitriles, such as 3-phenoxypropionitrile, 3-phenylmercaptopropionitrile, 3-(1-naphthoxy)propionitrile, 3-(2-naphthylmercapto)propionitrile, etc.; alkyl-substituted aryloxypropionitriles and arylmercaptopropionitriles, such as 3-(2 - methylphenoxy)propionitrile, 3 - (3 - methylphenylmercapto)propionitrile, 3 - (4 - methylphenoxy)propionitrile, 3 - (2 - methyl - 5 - isopropylphenoxy)propionitrile, 3 - (3 - methyl - 6 - isopropylphenylmercapto) propionitrile, 3 - (4 - nonylphenoxy)propionitrile 3-(3,5 - dimethylphenoxy)propionitrile, 3 - (3 - ethylphenylmercapto)propionitrile, 3 - (4 - isopropylphenylmercapto)propionitrile, 3 - (4 - octylphenoxy)propionitrile, etc.; alkoxy- and alkylmercapto- substituted aryloxypropionitriles and arylmercaptopropionitriles, such as 3 - (4 - methoxyphenoxy)propionitrile, 3 - (4 - ethylmercaptophenoxy)propionitrile, 3 - (3 - methoxyphenylmercapto)propionitrile, 3 - (5 - methoxy - 1 - naphthoxy)propionitrile, etc.; haloaryloxypropionitriles and haloarylmercaptopropionitriles, such as 3 - (4 - chlorophenoxy)propionitrile, 3 - (2 - chlorophenylmercapto) propionitrile, 3 - (4 - bromophenylmercapto)propionitrile, 3 - (2,4 - dichlorophenoxy)propionitrile, 3 - (2,4,5-trichlorophenylmercapto)propionitrile, 3 - (4 - chloro-2-naphthoxy)propionitrile, etc.; nitroaryloxypropionitriles and nitroarylmercaptopropionitriles, such as 3-(4-nitrophenoxy)propionitrile, 3-(2-nitrophenoxy)propionitrile, 3-(2,4-dinitrophenylmercapto)propionitrile, etc.; as well as numerous other substituted aryloxypropionitriles and arylmercaptopropionitriles, including those containing other substituents on the alpha or beta carbon atom of the propionitrile, such as 2-chloro-3-phenoxypropionitrile, 2-bromo-3-phenylmercaptopropionitrile, 2-methyl-3-(1-naphthoxy)propionitrile, and the like.

The foregoing and similar aryloxy- and arylmercaptopropionitriles can be cyclized in the presence of polyphosphoric acids at temperatures greater than 120° C., and preferably at a temperature between about 140° C. and about 200° C.

The term "polyphosphoric acid" refers to a polymeric straight-chain phosphate containing more than one —P—O— unit therein. Examples of such polymeric straight-chain phosphoric acids are pyrophosphoric acid, triphosphoric acid (also known as tripolyphosphoric acid), tetraphosphoric acid and higher polymeric members, of which the metaphosphoric acid (theoretically containing an infinite number of —P—O— units) is the limiting member. Mixtures of the foregoing polyphosphoric acids can also be used and, from the point of view of commercial availability, will generally be preferred. The polyphosphoric acids, as well as mixtures thereof, can be characterized in terms of molar ratio of $H_2O/P_2O_5$, as well as in terms of the number (or average number) of phosphorus atoms in the polymer chain. In general, acids or mixtures thereof having a molar ratio of $H_2O/P_2O_5$ less than 2.5 will be satisfactory. Acids having such a ratio less than 2 are preferred. Particularly suitable is the so-called tetraphosphoric acid (having an average of four —P—O— units per molecule), which contains about 16–17 weight percent of water of constitution and 83–84 weight percent of $P_2O_5$.

The reactions of the present invention are advantageously carried out with a considerable excess of the polyphosphoric acid, so that said acid functions as the reaction medium or diluent. In general, the molar ratio of polyphosphoric acid to the nitrile to be cyclized should be at least 1:1, and is preferably in excess of 2:1. The higher degrees of dilution are desirable because of their tendency to promote the desired intramolecular reaction rather than the undesired intermolecular reaction. Dilution effects in addition to those obtained by the use of excess polyphosphoric acid can also be obtained by the use of inert anhydrous solvents or diluents, e. g., organic solvents of the aromatic hydrocarbon type, such as toluene, xylene or mesitylene, various ethers such as diethyl cellosolve, di-n-butyl ether, diethyl carbitol, etc., and other inert organic liquids. The higher boiling point liquids are preferred, but the lower boiling materials can be utilized if under sufficient pressure to keep the diluents in the liquid state.

The reaction time required for cyclization of the present propionitrile compounds to the corresponding chromanimines will depend upon the reaction temperature, the particular nitrile to be cyclized, and the particular polyphosphoric acid or mixture of polyphosphoric acid selected, and may run from as low as two or three minutes to as high as two or three hours.

The resulting chromanimines are extremely hygroscopic and can be readily hydrolyzed to the corresponding chromanones. Consequently, a preferred embodiment of the present invention comprises the further hydrolysis to the 4-chromanones.

This hydrolysis may be carried out by leaving the chromanimine compound in the polyphosphoric acid reaction medium and maintaining the elevated reaction temperature for an extended period of time after the chromanimine has been formed. In this way, the water of constitution which is slowly evolved from the polyphosphoric acid is taken up by the chromanimine to give the chromanone. Since water is evolved only relatively slowly from polyphosphoric acid at the temperatures of the present cyclization reaction, the time necessary to hydrolyze the chromanimines in this way will be quite long—in some cases as long as several hours or more. Consequently, it will generally be much simpler and quicker to add water to the chromanimine-polyphosphoric acid reaction mixture, thereby allowing the hydrolysis of the chromanimine to chromanone to proceed very rapidly. The chromanones are oily liquids somewhat soluble in concentrated polyphosphoric acid but relatively insoluble in the dilute acid, so this latter method of hydrolysis serves the dual purpose of forming the desired 4-chromanones and causing the separation of said chromanones from the polyphosphoric acid reaction medium.

The following examples serve to illustrate in greater detail the practice of the processes of the present invention.

Example

One hundred grams of commercial tetraphosphoric acid (about 84 weight percent $P_2O_5$, 16 weight percent $H_2O$) was placed in a beaker and heated to 110° C., after which 20 g. of 3-phenoxypropionitrile was added thereto. The mixture was heated rapidly to 180° C. (over a period of about two minutes) during which time, the color of the reaction mixture changed to a dark red. The reaction temperature was lowered to about 170° C. and maintained at between 168–175° C. for 20 minutes. The resulting 4-chromanimine was then hydrolyzed by pouring the reaction mixture into 1 liter of ice water. Hydrolysis was accompanied by the precipitation of a black tarry residue. The resulting 4-chromanone was extracted by washing both the tarry residue and the aqueous-phase with benzene. The benzene extract was washed once with 5 percent sodium hydroxide and twice with water, and then dried over sodium sulfate. Volatilization of the benzene left 7.9 g. (39.5 percent yield) of the 4-chromanone as an orange oil, $n_d^{25}=1.5797$. The chromanone was characterized by reaction with phenylhydrazine to give 4-chromanone phenylhydrazone, M. P. 65–68° C., in 84.8 percent yield.

I claim:

1. The method for making 4-chromanones comprising heating a member of the group consisting of aryloxypropionitriles and arylmercaptopropionitriles at a temperature between about 140° C. and about 200° C. in the presence of a polyphosphoric acid, and thereafter adding water to form the 4-chromanone.

2. The method for making 4-chromanone comprising heating 3-phenoxypropionitrile at a temperature between about 140° C. and about 200° C. in the presence of a mixture of polyphosphoric acids having an average of about four phosphorus atoms per acid molecule, and thereafter adding water thereto, to form the 4-chromanone.

References Cited in the file of this patent

Elderfield Heterocyclic compounds, vol. 2, page 354.
Krollpfeiffer et al.: Berichte, vol. 57, pp. 206–207 (1924).